(12) United States Patent
Zhao

(10) Patent No.: US 12,493,336 B2
(45) Date of Patent: Dec. 9, 2025

(54) CONTROL METHOD AND ELECTRONIC DEVICE

(71) Applicant: Lenovo (Beijing) Limited, Beijing (CN)

(72) Inventor: Hongbo Zhao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 134 days.

(21) Appl. No.: 18/067,008

(22) Filed: Dec. 15, 2022

(65) Prior Publication Data

US 2023/0213995 A1 Jul. 6, 2023

(30) Foreign Application Priority Data

Dec. 30, 2021 (CN) .......................... 202111667231.4

(51) Int. Cl.
*G06F 1/00* (2006.01)
*G06F 1/3206* (2019.01)

(52) U.S. Cl.
CPC .................................. *G06F 1/3206* (2013.01)

(58) Field of Classification Search
CPC ...................................................... G06F 1/3206
See application file for complete search history.

(56) References Cited

U.S. PATENT DOCUMENTS

| | | | | |
|---|---|---|---|---|
| 9,971,535 B2* | 5/2018 | Wang | ................. | G06F 9/30032 |
| 10,014,869 B1* | 7/2018 | Bowles | ................. | H03K 3/017 |
| 2012/0117397 A1* | 5/2012 | Kolvick | ................. | G06F 1/3296 |
| | | | | 713/320 |
| 2014/0298056 A1* | 10/2014 | Seki | ...................... | G06F 1/3275 |
| | | | | 713/320 |
| 2016/0259649 A1* | 9/2016 | Poornachandran | ... | G06F 1/3203 |
| 2017/0083383 A1* | 3/2017 | Rider | ................... | G06F 9/4893 |
| 2018/0095522 A1* | 4/2018 | Huang | ................ | G06F 11/3055 |
| 2019/0065359 A1* | 2/2019 | Rangarajan | ......... | G06F 11/3656 |
| 2019/0265778 A1* | 8/2019 | Srinivas | .................. | G11C 5/14 |
| 2020/0183597 A1* | 6/2020 | Das | ........................ | G06F 1/3275 |
| 2021/0142806 A1* | 5/2021 | Kim | ....................... | G10L 15/063 |
| 2021/0373639 A1* | 12/2021 | Kontorinis | ............ | G06F 9/5094 |
| 2024/0012706 A1* | 1/2024 | Han | .................... | G06F 11/2284 |

\* cited by examiner

*Primary Examiner* — Mohammed H Rehman
(74) *Attorney, Agent, or Firm* — ANOVA LAW GROUP, PLLC

(57) ABSTRACT

A control method includes obtaining a control instruction, and in response to an electronic device being in a first state, triggering the electronic device to switch from the first state to a second state, and updating a parameter of a target member from a corresponding parameter in a first operation state to a corresponding parameter in a second operation state during switching the electronic device from the first state to the second state. The control instruction is configured to instruct to switch the target member of the electronic device from the first operation state to the second operation state. A frequency of the target member in the first operation state is different from a frequency of the target member in the second operation state. A power consumption of the electronic device in the first state is lower than a power consumption of the electronic device in the second state.

20 Claims, 3 Drawing Sheets

CONTROL METHOD AND ELECTRONIC DEVICE

CROSS-REFERENCE TO RELATED APPLICATION

The present application claims priority to Chinese Patent Application No. 202111667231.4, filed Dec. 30, 2021, the entire content of which is incorporated herein by reference.

TECHNICAL FIELD

The present disclosure relates to the field of control technology and, in particular, to a control method, an apparatus, an electronic device, and a storage medium.

BACKGROUND

At present, when a member, for example, a memory, of an electronic device, is switched from a normal operation state to an overclocking operation state, or from the overclocking operation state to the normal operation state, a parameter of the member needs to be modified. The electronic device needs to be restarted during the operation state switching process of the member. It also requires participation of a user several times, so that a time required for the member to switch the operation state is relatively long.

SUMMARY

In accordance with the disclosure, there is provided a control method including obtaining a control instruction, and in response to an electronic device being in a first state, triggering the electronic device to switch from the first state to a second state, and updating a parameter of a target member from a corresponding parameter in a first operation state to a corresponding parameter in a second operation state during switching the electronic device from the first state to the second state. The control instruction is configured to instruct to switch the target member of the electronic device from the first operation state to the second operation state. A frequency of the target member in the first operation state is different from a frequency of the target member in the second operation state. A power consumption of the electronic device in the first state is lower than a power consumption of the electronic device in the second state.

Also in accordance with the disclosure, there is provided an electronic device including a memory storing a computer program, and a processor configured to execute the computer program to obtain a control instruction, and in response to the electronic device being in a first state, trigger the electronic device to switch from the first state to a second state, and update a parameter of a target member from a corresponding parameter in a first operation state to a corresponding parameter in a second operation state during switching the electronic device from the first state to the second state. The control instruction is configured to instruct to switch the target member of the electronic device from the first operation state to the second operation state. A frequency of the target member in the first operation state is different from a frequency of the target member in the second operation state. A power consumption of the electronic device in the first state is lower than a power consumption of the electronic device in the second state.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

In an existing control method, taking memory overclocking as an example, to switch a memory of a computer (notebook or desktop, etc.) from a normal operation state to an overclocking operation state when the computer is in a normal state, a user needs to save information (for example, save open documents, close documents, etc.), trigger a restart process, operate a specific button during the restart process to enter a Basic Input Output System (BIOS) interface, perform overclocking settings on the BIOS interface, save the settings, and then restart the system. The memory is trained during the restart process. After the training is completed, the operation system is started, and the switching of the memory from the normal operation state to the overclocking operation state is completed. This process requires participation of a user several times, such as saving information, triggering the restart process, operation buttons, overclocking settings, etc. Moreover, even if manual operation is not considered, the process needs to go through a shutdown and startup process, which usually takes half a minute to shut down and start a new machine and takes half a minute to train the memory. Therefore, the existing control method needs at least 1 minute to complete switching the memory from the normal operation state to the overclocking operation state. With the increase of the using time of the machine, the time it takes to start and shut down the machine increases accordingly, and the time required for the corresponding memory to switch from the normal operation state to the overclocking operation state also increases. With the time spent on manual operations, the total time becomes longer.

A control method consistent with the embodiments of the present disclosure is provided, which can be applied in an electronic device. The electronic device can be a notebook computer or a desktop computer.

Figure 1:
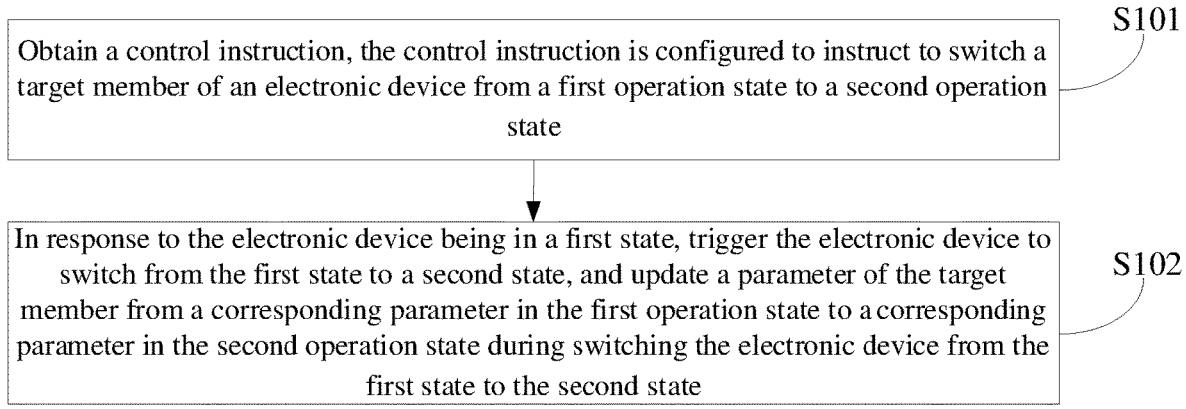
FIG. 1 is a schematic flow chart of a control method consistent with the embodiments of the disclosure.

FIG. 1 is a schematic flow chart of a control method consistent with the embodiments of the disclosure. As shown in FIG. 1, the control method includes the following processes.

At S101, a control instruction is obtained. The control instruction is configured to instruct to switch a target member of an electronic device from a first operation state to a second operation state. A frequency of the target member in the first operation state is different from a frequency of the target member in the second operation state.

The target member may be any member in the electronic device that can switch the frequency (or referred to as operation frequency). The target member may include a memory, a general-purpose processor (CPU), or a graphics processor (GPU).

The control instruction may be triggered and generated by a user through a hot key (such as a function key of a keyboard or a mouse, etc.), or may be triggered and generated by the user through a configuration interface displayed in an output area of the electronic device.

In some embodiments, the frequency of the target member in the first operation state is lower than the frequency of the target member in the second operation state. Switching the target member from the first operation state to the second operation state is called overclocking. In some embodiments, the frequency of the target member in the first operation state is greater than the frequency of the target member in the second operation state.

At S102, in response to the electronic device being in the first state, the electronic device is triggered to switch from a first state to a second state, and a parameter of the target member is updated from a corresponding parameter in the first operation state to a corresponding parameter in the second operation state during switching the electronic device from the first state to the second state.

A power consumption of the electronic device in the first state is lower than a power consumption of the electronic device in the second state. The first state is not a shutdown state. For example, the first state may be a modern standby (MS) state, a suspend to disk (S4) state, or a suspend to RAM (S3) state. The second state may be a normal operation state.

When the control instruction is obtained, the electronic device may or may not be in the first state. If the electronic device is not in the first state, the electronic device needs to be controlled to enter the first state first.

The parameter of the target member is updated from the corresponding parameter in the first operation state to the corresponding parameter in the second operation state, so that the target member is switched from the current first operation state to the second operation state. That is, during switching the electronic device from the first state to the second state, the target member is switched from the current first operation state to the second operation state.

The control method consistent with the embodiments of the present disclosure does not require restarting the electronic device, and only needs to trigger the control instruction by the user to switch the target member from the first operation state to the second operation state, thereby shortening the time required for the target member to switch the operation state.

In some embodiments, obtaining the control instruction may include obtaining the control instruction in response to the electronic device being in the first state.

When the electronic device is in the first state, the user can trigger the generation of the control instruction by operation on the hot key. For example, the operation on the hot key may include a long press or continuously click at a specific key, or one or more short presses at one or more keys, etc.

For different target members, different hot keys can be used to trigger the corresponding control instructions of the target members.

In some embodiments, obtaining the control instruction may include obtaining the control instruction in response to the electronic device being in the second state.

When the electronic device is in the second state, the user can trigger the generation of the control instruction by operation on the hot key. For example, the operation on the hot key may include a long press or continuously click at a specific key, or one or more short presses at one or more keys, etc. For different target members, different hot keys can be used to trigger the corresponding control instructions of the target members.

In some embodiments, when the electronic device is in the second state, the user can find a setting interface, and operate on a preset switch on the setting interface to trigger the generation of the control instruction. For different target members, the control instructions corresponding to the target members can be triggered by setting different preset switches on the setting interface.

In some embodiments, if the control instruction is obtained in response to the electronic device being in the second state, the control method may further include controlling the electronic device to switch from the second state to the first state, to trigger the electronic device to switch from the first state to the second state and update the parameter of the target member from the corresponding parameter in the first operation state to the corresponding parameter in the second operation state during switching the electronic device from the first state to the second state.

In some embodiments, after the electronic device is controlled to switch from the second state to the first state, a timer may be used to trigger the electronic device to switch from the first state to the second state. For example, timing can be started when the electronic device is switched from the second state to the first state. When a duration of the timing reaches a preset duration (e.g., 1 s or 1 ms), the electronic device is triggered to switch from the first state to the second state.

Figure 2:
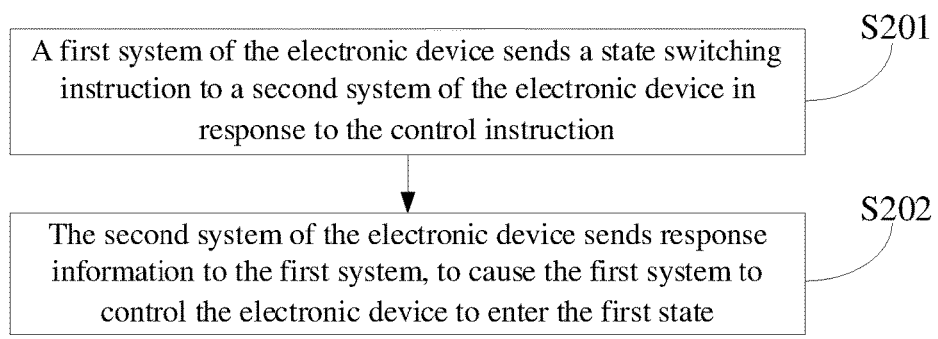
FIG. 2 is a schematic flow chart of controlling an electronic device to switch from a second state to a first state according to an example embodiment of the disclosure.

FIG. 2 is a schematic flow chart of controlling an electronic device to switch from a second state to a first state according to an example embodiment of the disclosure. In an example embodiment, as shown in FIG. 2, when the control instruction is obtained through the setting interface, controlling the electronic device to switch from the second state to the first state includes the following processes.

At S201, in response to the control instruction, a first system of the electronic device sends a state switching instruction to a second system of the electronic device.

The first system may be an operation system, for example, a windows operation system or a Unix operation system, of the electronic device.

The second system may be a booting system, for example, a basic input output system (BIOS) of the electronic device. The BIOS may be a traditional BIOS or a BIOS that supports unified extensible firmware inter (UEFI).

When the control instruction is obtained through the setting interface, because the setting interface is provided by the first system, the first system can directly obtain the control instruction and respond.

At S202, the second system sends response information to the first system, to cause the first system to control the electronic device to enter the first state.

After the state switching instruction is received, the second system sends a response message to the first system, so that the first system confirms that the second system has received the state switching instruction. At this time, the first system can control the electronic device to switch from the second state to first state.

The second system may send a response message to a target service of the first system, so that the target service detects that the electronic device can be controlled to enter the first state. Then the target service controls the electronic device to switch from the second state to the first state.

Figure 3:
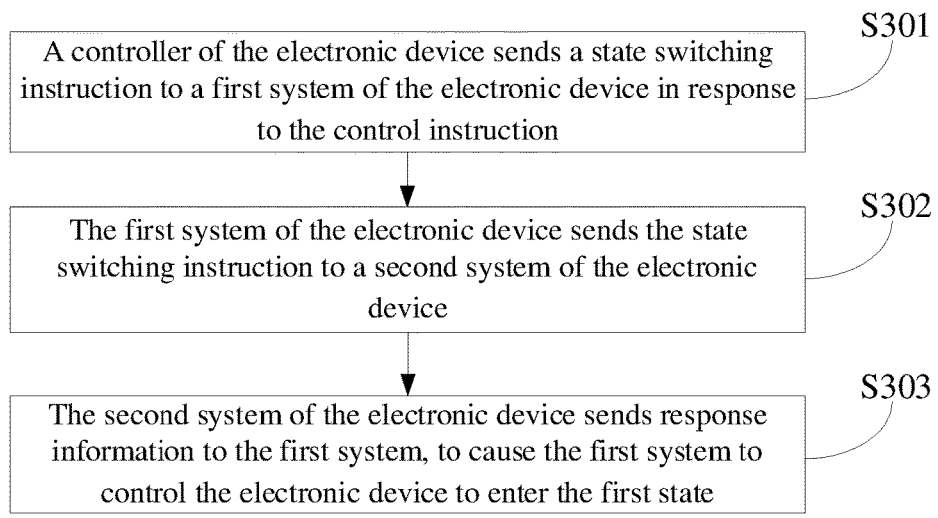
FIG. 3 is a schematic flow chart of controlling an electronic device to switch from a second state to a first state according to an example embodiment of the disclosure.

FIG. 3 is a schematic flow chart of controlling an electronic device to switch from a second state to a first state according to an example embodiment of the disclosure. As shown in FIG. 3, in some embodiments, when the control instruction is obtained through the hot key, controlling the electronic device to switch from the second state to the first state includes the following processes.

At S301, a controller of the electronic device sends a state switching instruction to the first system in response to the control instruction.

The first system may be an operation system, for example, a windows operation system or a Unix operation system, of the electronic device.

For example, the controller may be an Embedded Controller (EC), which may be implemented by a microcontroller. The controller is connected to a keyboard and can detect a signal generated when the hot key is operated. After the controller detects the signal generated when the hot key is operated, the controller sends an interaction request to the first system through the interface. After the interaction request is received, the first system instructs a controller driving unit in the first system to interact with the controller. The controller driving unit can send a response message to the controller. After the response message is received, the controller sends the state switching instruction to the controller driving unit.

At S302, the first system sends the state switching instruction to the second system of the electronic device.

The second system may be a booting system, for example, a basic input output system (BIOS) of the electronic device. The BIOS may be a traditional BIOS or a BIOS that supports unified extensible firmware inter (UEFI).

After the state switching instruction sent by the embedded controller is received, the controller driving unit may send the state switching instruction to the second system.

At S303, the second system sends response information to the first system, to cause the first system to control the electronic device to enter the first state.

The second system can send a response message to the target service in the first system after receiving the state switching instruction sent by the controller driving unit, so that the target service detects that the electronic device can be controlled to enter the first state. Then, the target service controls the electronic device to switch from the second state to the first state.

In some embodiments, the control method consistent with the embodiments of the present disclosure may further include setting a state switching flag in the second system. The state switching flag is set by the second system. In some embodiments, updating the parameter of the target member from the corresponding parameter in the first operation state to the corresponding parameter in the second operation state during switching the electronic device from the first state to the second state, includes: during switching the electronic device from the first state to the second state, updating, by the second system, the parameter of the target member from the corresponding parameter in the first operation state to the corresponding parameter in the second operation state based on the state switching flag.

By setting the state switching flag, the second system can update the parameter of the target member from the corresponding parameter in the first operation state to the corresponding parameter in the second operation state when the state switching flag exists. If there is no state switching flag, the parameter of the target member does not be updated from the corresponding parameter in the first operation state to the corresponding parameter in the second operation state.

When the user uses the electronic device, the user may trigger the electronic device to switch from the first state to the second state for other reasons. When the electronic device is switched from the first state to the second state, it is not necessary to update the parameter of the target member from the corresponding parameter in the first operation state to the corresponding parameter in the second operation state. Therefore, in order not to affect the normal use of the electronic device by the user, after the second system receives the state switching instruction sent by the first system, the second system sets the state switching flag to indicate that switching of the operation state of the target member is to be performed. During switching the electronic device from the first state to the second state, the second system determines whether there is a state switching flag, and if so, updates the parameter of the target member from the corresponding parameter in the first operation state to the second operation state. Otherwise, the parameter of the target member is prevented from being updated from the corresponding parameter in the first operation state to the corresponding parameter in the second operation state.

After the parameter of the target member is updated from the corresponding parameter in the first operation state to the corresponding parameter in the second operation state, the second system deletes the state switching flag.

In some embodiments, the control method consistent with the embodiments of the present disclosure may further include outputting, by the first system, an interaction interface.

In some embodiments, the first system may output the interaction interface in response to the control instruction, or the first system may output the interaction interface when the first system receives the response message sent by the second system.

The first system may receive an input target parameter through the interaction interface. The input target parameter indicates that the second operation state is a target operation state.

In a practical application scenario, a member may have a plurality of operation states, for example, 4800 MHz operation state, 5200 MHz operation state, 5600 MHz operation state, etc. For example, when the target member is in the first operation state, the frequency is 4800 MHz. When the user needs to overclock the target member, the user can choose the 5200 Hz operation state or the 5600 MHz operation state. The frequencies can be set at the interaction interface. The user can select one of 5200 MHz and 5600 MHz to realize the input of the target parameter. The target parameter represents the frequency selected by the user. For example, if the user selects 5200 MHz, the target parameter takes the value "a." If the user chooses 5600 MHz, the target parameter takes the value "b."

The first system sends the target parameter to the second system, so that the second system sets the state switching flag. The state switching flag indicates to switch the target member from the current first operation state to the target operation state.

After the target parameter is received, the second system can determine whether to switch the target member to the 5200 MHz operation state or the 5600 MHz operation state according to the target parameter, and then determine the state switching flag according to the target parameter. For example, if the value of the target parameter is "a," the second system sets the state switching flag to Flag1, indicating that the target member is to be switched from the current 4800 MHz operation state to the 5200 MHz operation state. If the value of the target parameter is "b," the second system sets the state switching flag to Flag2, indicating that the target member is to be switched from the current 4800 MHz operation state to the 5600 MHz operation state.

The user can set the operation state to which the target member is to be switched as required, thereby improving the convenience of switching the operation state of the target member.

Figure 4:
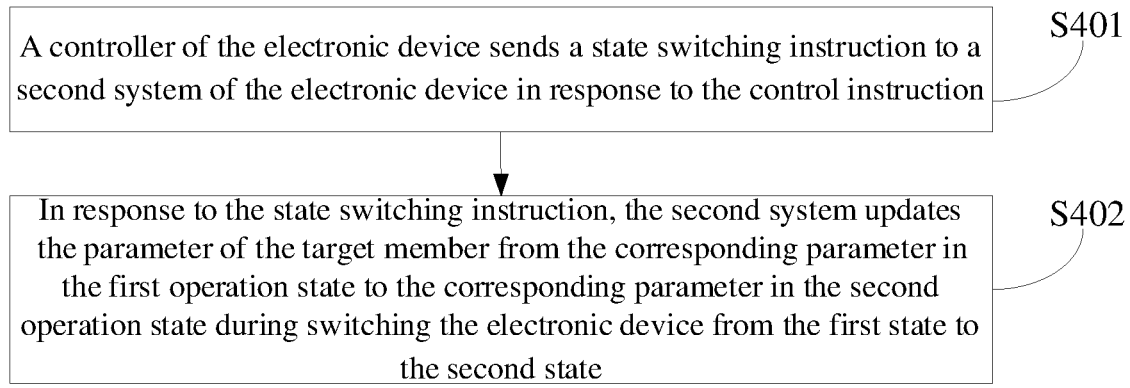
FIG. 4 is a schematic flow chart of updating a parameter of a target member from a corresponding parameter in a first operation state to a corresponding parameter in a second operation state according to an example embodiment of the disclosure.

In some embodiments, if the control instruction is obtained when the electronic device is in the first state, the electronic device starts switching from the first state to the second state. FIG. 4 is a schematic flow chart of updating a parameter of a target member from a corresponding parameter in a first operation state to a corresponding parameter in a second operation state according to an example embodiment of the disclosure. As shown in FIG. 4, in some embodiments, updating a parameter of the target member from a corresponding parameter in the first operation state to a corresponding parameter in the second operation state during switching the electronic device from the first state to the second state, includes the following processes.

At S401, in response to the control instruction, a controller of the electronic device sends a state switching instruction to a second system of the electronic device.

For example, the controller may be an Embedded Controller (EC), which may be implemented by a microcontroller. The controller is connected to a keyboard and can detect a signal generated when the hot key is operated.

The second system may be a booting system, for example, a basic input output system (BIOS) of the electronic device. The BIOS may be a traditional BIOS or a BIOS that supports unified extensible firmware inter (UEFI).

After the controller detects the signal generated when the hot key is operated, the controller sends the state switching instruction to the second system through an interface.

At S402, in response to the state switching instruction, the second system updates the parameter of the target member from the corresponding parameter in the first operation state to the corresponding parameter in the second operation state during switching the electronic device from the first state to the second state.

After the second system receives the state switching instruction, the second system does not need to set the state switching flag, but directly updates the parameter of the target member from the corresponding parameter in the first operation state to the corresponding parameter in the second operation state during switching the electronic device from the first state to the second state.

When the electronic device is in the first state, switching the operation state of the target member can be triggered, thereby further improving the convenience of user operations.

Figure 5:
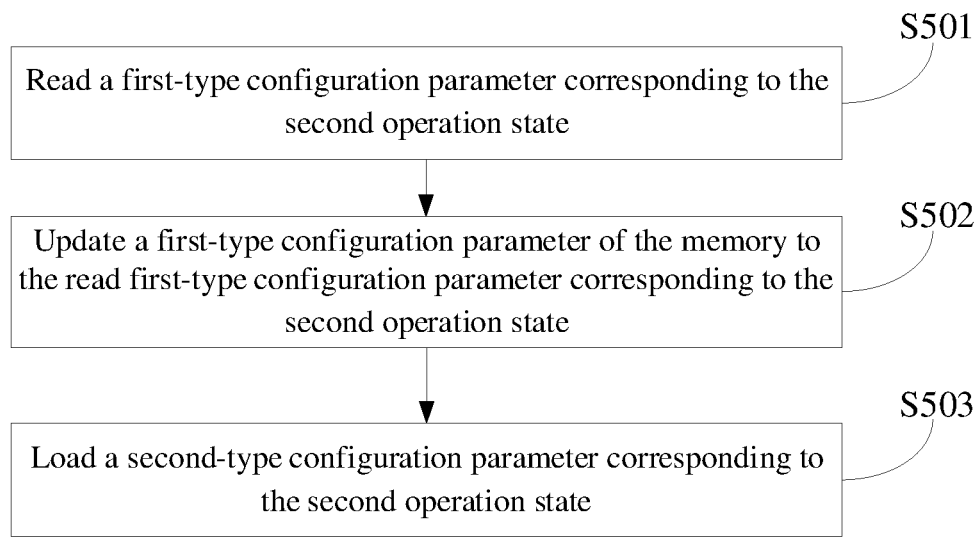
FIG. 5 is a schematic flow chart of updating a parameter of a target member from a corresponding parameter in a first operation state to a corresponding parameter in a second operation state according to an example embodiment of the disclosure.

In some embodiments, the target member may be a memory. FIG. 5 is a schematic flow chart of updating a parameter of a target member from a corresponding parameter in a first operation state to a corresponding parameter in a second operation state according to an example embodiment of the disclosure. As shown in FIG. 5, in some embodiments, updating the parameter of the target member from the corresponding parameter in the first operation state to the corresponding parameter in the second operation state includes the following processes.

At S501, a first-type configuration parameter corresponding to the second operation state is read.

The corresponding parameter in the operation state of the memory includes two types of configuration parameters: the first-type configuration parameter and the second-type configuration parameter. That is, for each operation state, the memory has two types of configuration parameters. When the memory and the operation state of the memory are determined, the first-type configuration parameter is fixed, and the second-type configuration parameter is obtained by training the memory.

For example, the first-type configuration parameter may include, but is not limited to serial presence detect (SPD) information and a memory voltage.

At S502, a first-type configuration parameter of the memory is updated to the read first-type configuration parameter corresponding to the second operation state.

At S503, a second-type configuration parameter corresponding to the second operation state is loaded. The second-type configuration parameter is obtained by training the target member. That is, the second-type configuration parameter of the memory is updated to the loaded second-type configuration parameter.

In some embodiments, the second-type configuration parameter may be obtained by training the memory after updating the first-type configuration parameter. Based on this, loading the second-type configuration parameter corresponding to the second operation state may include: training the target member based on the updated first-type configuration parameter to obtain the second-type configuration parameter, and loading the second-type configuration parameters. For the specific training process, reference can be made to the existing technologies, which will not be described in detail here.

When the memory and the operation state of the memory are determined, the first-type configuration parameter is fixed. Therefore, for the memory, the memory can be trained based on the first-type configuration parameter corresponding to the second operation state in advance, to obtain the second-type configuration parameter corresponding to the second operation state. When the second-type configuration parameter corresponding to the second operation state needs to be loaded, the second-type configuration parameter corresponding to the second operation state can be directly loaded without any immediate training, thereby further improving the efficiency of the switching of the operation state of the memory. Therefore, the second-type configuration parameter may be obtained by training the memory in advance. In some embodiments, loading the second-type configuration parameter corresponding to the second operation state may include loading a historical second-type configuration parameter obtained from a previous (e.g., a most recent) training on the target member (i.e., the memory).

The existing electronic device usually starts up after the electronic device is completely powered off, or performs a training process on the memory when the electronic device starts up after a hardware of the electronic device is replaced. In some embodiments, the memory can be trained based on the first-type configuration parameter corresponding to the second operation state when the electronic device starts up after the electronic device is completely powered off, or when the electronic device starts up after the hardware is replaced.

When the electronic device starts up after the electronic device is completely powered off, or when the electronic device starts up after the hardware is replaced, the memory can be trained for the plurality of operation states of the memory, to obtain the second-type configuration parameter corresponding to each of the plurality of operation states of the memory. Thereby, the second-type configuration parameter can be directly loaded when the operation state of the memory is switched.

Corresponding to each of the plurality of operation states of the memory, the memory can be trained based on the first-type configuration parameter corresponding to the each of the plurality of operation states to obtain the second-type configuration parameter corresponding to the each of the plurality of operation states of the memory.

The first-type configuration parameter and the second-type configuration parameter may be stored in a memory carried by the second system.

After the training is completed, the first-type configuration parameter and the second-type configuration parameter corresponding to the operation state may be loaded based on the operation state of the memory set by the electronic device.

In some embodiments, when the first state of the electronic device is a sleep state, the control method consistent with the embodiments of the present disclosure may further include: obtaining the control instruction in response to the electronic device being in the second state, and saving data in the memory to a hard disk after the electronic device is controlled to switch from the second state to the first state. The data in the memory can be saved to the hard disk by the second system.

During switching the electronic device from the first state to the second state, the data in the hard disk is restored to the memory. The data in the hard disk can be restored to the memory by the second system.

When the first state is the sleep state, the data is stored in the memory. To avoid loss of memory data caused by the switching of the operation state of the target member, after the electronic device is switched from the second state to the first state, the data in the memory is saved to the hard disk. The data in the hard disk is restored to the memory during switching the electronic device from the first state to the second state.

Taking the first state being the sleep state or the modern standby (MS) state and the second state being the normal operation state as an example, during switching the electronic device from the first state to the second state, the BIOS may undergo security (SEC), pre-EFI initialization (PEI), driver execution environment (DXE), boot device select (BDS), and other stages.

During switching the electronic device from the first state to the second state, the parameter of the target member is updated from the corresponding parameter in the first operation state to the corresponding parameter in the second operation state. For example, in the PEI stage of the second system, the parameter of the target member is updated from the corresponding parameter in the first operation state to the corresponding parameter in the second operation state.

Figure 6:
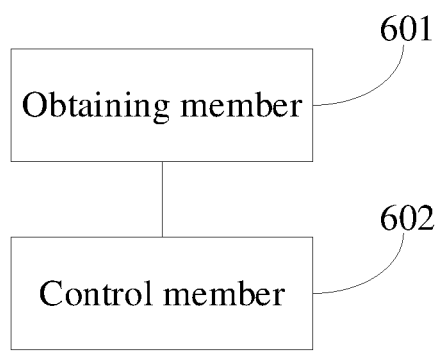
FIG. 6 is a schematic structural diagram of a control apparatus consistent with the embodiments of the disclosure.

A control device consistent with the embodiments of the present disclosure is provided. FIG. 6 is a schematic structural diagram of a control apparatus consistent with the embodiments of the disclosure. As shown in FIG. 6, the control device includes an obtaining member 601 and a control member 602.

The obtaining member 601 is used to obtain a control instruction. The control instruction is configured to instruct to switch a target member of an electronic device from a first operation state to a second operation state. A frequency of the target member in the first operation state is different from a frequency of the target member in the second operation state.

The control member 602 is configured to, in response to the electronic device being in the first state, trigger the electronic device to switch from a first state to a second state and update a parameter of the target member from a corresponding parameter in the first operation state to a corresponding parameter in the second operation state during switching the electronic device from the first state to the second state.

A power consumption of the electronic device in the first state is lower than a power consumption of the electronic device in the second state.

The control device does not need to restart the electronic device, but only needs to trigger the control instruction by the user to switch the target member from the first operation state to the second operation state, thereby shortening the time required for the target member to perform the switching of the operation state.

In some embodiments, the obtaining member 601 is further configured to obtain the control instruction in response to the electronic device being in the first state, or obtain the control instruction in response to the electronic device being in the second state.

In some embodiments, if the obtaining member 601 obtains the control instruction in response to the electronic device being in the second state, the control member 602 is further configured to control the electronic device to switch from the second state to the first state.

In some embodiments, the control member 602 is further configured to control a first system of the electronic device to send a state switching instruction to a second system of the electronic device in response to the control instruction, and control the second system of the electronic device to send response information to the first system, to cause the first system to control the electronic device to enter the first state.

In some embodiments, the control member 602 is further configured to control a controller of the electronic device to send a state switching instruction to a first system of the electronic device in response to the control instruction, control the first system of the electronic device to send the state switching instruction to a second system of the electronic device, and control the second system of the electronic device to send response information to the first system, to cause the first system to control the electronic device to enter the first state.

In some embodiments, the control member 602 is further configured to set a state switching flag in the second system, and during switching the electronic device from the first state to the second state, control the second system to update the parameter of the target member from the corresponding parameter in the first operation state to the corresponding parameter in the second operation state based on the state switching flag.

In some embodiments, if the obtaining member 601 obtains the control instruction in response to the electronic device being in the first state, the control member 602 is further configured to control a controller of the electronic device to send a state switching instruction to a second system of the electronic device in response to the control instruction, and in response to the state switching instruction, control the second system to update the parameter of the target member from the corresponding parameter in the first operation state to the corresponding parameter in the second operation state.

In some embodiments, the target member is a memory. The control member 602 updates the parameter of the target member from the corresponding parameter in the first operation state to the corresponding parameter in the second operation state by reading a first-type configuration parameter corresponding to the second operation state, updating a first-type configuration parameter of the memory to the read first-type configuration parameter corresponding to the second operation state, and loading a second-type configuration parameter corresponding to the second operation state, the second-type configuration parameter being obtained by training the target member.

In some embodiments, the control member 602 loads the second-type configuration parameter corresponding to the second operation state by training the target member based on the updated first-type configuration parameter to obtain the second-type configuration parameter, and loading the second-type configuration parameters; or loading a historical second-type configuration parameter obtained from a previous training of the target member.

Figure 7:
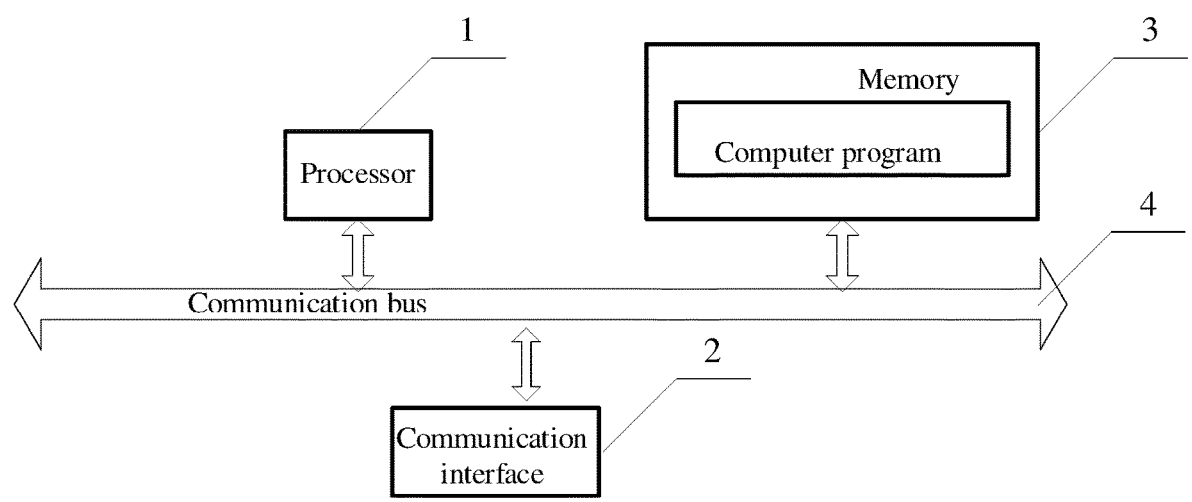
FIG. 7 is a schematic structural diagram of an electronic device consistent with the embodiments of the disclosure.

FIG. 7 is a schematic structural diagram of an electronic device consistent with the embodiments of the disclosure. As shown in FIG. 7, the electronic device includes a processor 1, a communication interface 2, a memory 3, and a communication bus 4. The processor 1, the communication interface 2, and the memory 3 communicate with each other through the communication bus 4.

The processor 1 may be a central processing unit (CPU), an application specific integrated circuit (ASIC), or one or more integrated circuits configured to implement the embodiments of the present disclosure.

The memory 3 may include a high-speed RAM memory or a non-volatile memory, for example, a disk memory.

The memory 3 stores a computer program. The processor 1 is configured to execute the computer program stored in the memory 3 to obtain a control instruction, and in response to the electronic device being in a first state, trigger the electronic device to switch from the first state to a second state, and update a parameter of a target member from a corresponding parameter in a first operation state to a corresponding parameter in a second operation state during switching the electronic device from the first state to the second state. The control instruction is configured to instruct to switch the target member of the electronic device from the first operation state to the second operation state. A frequency of the target member in the first operation state is different from a frequency of the target member in the second operation state. A power consumption of the electronic device in the first state is lower than a power consumption of the electronic device in the second state.

In some embodiments, the refinement function and extension function of the program may refer to the above description of the method embodiments.

A non-transitory computer-readable storage medium consistent with the embodiments of the present disclosure is provided. The non-transitory computer-readable storage medium stores a computer program, when executed by a processor, causing the processor to obtain a control instruction, and in response to the electronic device being in a first state, trigger the electronic device to switch from the first state to a second state, and update a parameter of a target member from a corresponding parameter in a first operation state to a corresponding parameter in a second operation state during switching the electronic device from the first state to the second state. The control instruction is configured to instruct to switch the target member of the electronic device from the first operation state to the second operation state. A frequency of the target member in the first operation state is different from a frequency of the target member in the second operation state. A power consumption of the electronic device in the first state is lower than a power consumption of the electronic device in the second state.

In some embodiments, the refinement function and extension function of the program may refer to the above description of the method embodiments.

The disclosed systems, apparatuses, and methods may be implemented in other manners not described here. For example, the devices described above are merely illustrative. For example, the division of units may only be a logical function division, and there may be other ways of dividing the units. For example, multiple units or members may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate members may or may not be physically separate, and a member shown as a unit may or may not be a physical unit. That is, the units may be located in one place or may be distributed over a plurality of network elements. Some or all of the members may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the application being indicated by the following claims.

What is claimed is:

1. A control method comprising:
obtaining a control instruction, the control instruction being configured to instruct to switch a memory of an electronic device from a first operation state to a second operation state, a frequency of the memory in the first operation state being different from a frequency of the memory in the second operation state, one of the first operation state or the second operation state comprising a normal frequency operation state, an other of the first operation state or the second operation state comprising an overclocking operation state; and in response to the electronic device being in a first state, triggering the electronic device to switch from the first state to a second state, and updating a parameter of the memory from a corresponding parameter in the first operation state to a corresponding parameter in the second operation state during switching the electronic device from the first state to the second state without restarting the electronic device, the first state comprising a low power standby state that is not a shutdown state, the second state comprising a normal operation state;

wherein a power consumption of the electronic device in the first state is lower than a power consumption of the electronic device in the second state.

2. The method of claim 1, wherein obtaining the control instruction includes:

obtaining the control instruction in response to the electronic device being in the first state; or obtaining the control instruction in response to the electronic device being in the second state.

3. The method of claim 1, wherein:

obtaining the control instruction includes:

obtaining the control instruction in response to the electronic device being in the second state; and the method further comprises:

controlling the electronic device to switch from the second state to the first state.

4. The method of claim 3, wherein controlling the electronic device to switch from the second state to the first state includes:

sending, by a first system of the electronic device, a state switching instruction to a second system of the electronic device in response to the control instruction; and sending, by the second system of the electronic device, response information to the first system, to cause the first system to control the electronic device to enter the first state.

5. The method of claim 4, further comprising:

setting a state switching flag in the second system;

wherein updating the parameter of the memory from the corresponding parameter in the first operation state to the corresponding parameter in the second operation state during switching the electronic device from the first state to the second state, includes:

during switching the electronic device from the first state to the second state, updating, by the second system, the parameter of the memory from the corresponding parameter in the first operation state to the corresponding parameter in the second operation state based on the state switching flag.

6. The method of claim 4, wherein the first system of the electronic device comprises an operating system, and the second system of the electronic device comprises firmware for booting.

7. The method of claim 3, wherein controlling the electronic device to switch from the second state to the first state includes:

sending, by a controller of the electronic device, a state switching instruction to a first system of the electronic device in response to the control instruction;

sending, by the first system of the electronic device, the state switching instruction to a second system of the electronic device; and sending, by the second system of the electronic device, response information to the first system, to cause the first system to control the electronic device to enter the first state.

8. The method of claim 7, further comprising:

setting a state switching flag in the second system;

wherein updating the parameter of the memory from the corresponding parameter in the first operation state to the corresponding parameter in the second operation state during switching the electronic device from the first state to the second state, includes:

during switching the electronic device from the first state to the second state, updating, by the second system, the parameter of the memory from the corresponding parameter in the first operation state to the corresponding parameter in the second operation state based on the state switching flag.

9. The method of claim 1, wherein:

obtaining the control instruction includes:

obtaining the control instruction in response to the electronic device being in the first state; and updating a parameter of the memory from a corresponding parameter in the first operation state to a corresponding parameter in the second operation state during switching the electronic device from the first state to the second state, includes:

sending, by a controller of the electronic device, a state switching instruction to a second system of the electronic device in response to the control instruction; and in response to the state switching instruction, updating, by the second system, the parameter of the memory from the corresponding parameter in the first operation state to the corresponding parameter in the second operation state.

10. The method of claim 1, wherein:

updating the parameter of the memory from the corresponding parameter in the first operation state to the corresponding parameter in the second operation state, includes:

reading a first-type configuration parameter corresponding to the second operation state;

updating a first-type configuration parameter of the memory to the read first-type configuration parameter corresponding to the second operation state; and loading a second-type configuration parameter corresponding to the second operation state, the second-type configuration parameter being obtained by training the target member.

11. The method according to claim 10, wherein loading the second-type configuration parameter corresponding to the second operation state includes:

training the memory based on the updated first-type configuration parameter to obtain the second-type configuration parameter, and loading the second-type configuration parameters; or loading a historical second-type configuration parameter obtained from a previous training of the memory.

12. The method of claim 1, wherein the the parameter of the memory is updated from the corresponding parameter in the first operation state to the corresponding parameter in the second operation state in a pre-extensible firmware interface (EFI) initialization (PEI) stage during the switching from the first state to the second state.

13. An electronic device comprising:

a memory storing a computer program; and a processor configured to execute the computer program to:

obtain a control instruction, the control instruction being configured to instruct to switch a memory of the electronic device from a first operation state to a second operation state, a frequency of the memory in the first operation state being different from a frequency of the memory in the second operation state, one of the first operation state or the second operation state comprising a normal frequency operation state, an other of the first operation state or the second operation state comprising an overclocking operation state; and in response to the electronic device being in a first state, trigger the electronic device to switch from the first state to a second state, and update a parameter of the memory from a corresponding parameter in the first operation state to a corresponding parameter in the second operation state during switching the electronic device from the first state to the second state without restarting the electronic device, the first state comprising a low power standby state that is not a shutdown state, the second state comprising a normal operation state;

wherein a power consumption of the electronic device in the first state is lower than a power consumption of the electronic device in the second state.

14. The electronic device of claim 13, wherein the processor is further configured to execute the computer program to:

obtain the control instruction in response to the electronic device being in the first state; or obtain the control instruction in response to the electronic device being in the second state.

15. The electronic device of claim 13, wherein the processor is further configured to execute the computer program to:

obtain the control instruction in response to the electronic device being in the second state; and control the electronic device to switch from the second state to the first state.

16. The electronic device of claim 15, wherein the processor is further configured to execute the computer program to:

control a first system of the electronic device to send a state switching instruction to a second system of the electronic device in response to the control instruction; and control the second system of the electronic device to send response information to the first system, to cause the first system to control the electronic device to enter the first state.

17. The electronic device of claim 16, wherein the processor is further configured to execute the computer program to:

set a state switching flag in the second system; and during switching the electronic device from the first state to the second state, control the second system to update the parameter of the memory from the corresponding parameter in the first operation state to the corresponding parameter in the second operation state based on the state switching flag.

18. The electronic device of claim 15, wherein the processor is further configured to execute the computer program to:

control a controller of the electronic device to send a state switching instruction to a first system of the electronic device in response to the control instruction;

control the first system of the electronic device to send the state switching instruction to a second system of the electronic device; and control the second system of the electronic device to send response information to the first system, to cause the first system to control the electronic device to enter the first state.

19. The electronic device of claim 18, wherein the processor is further configured to execute the computer program to:

set a state switching flag in the second system; and during switching the electronic device from the first state to the second state, control the second system to update the parameter of the memory from the corresponding parameter in the first operation state to the corresponding parameter in the second operation state based on the state switching flag.

20. The electronic device of claim 13, wherein the processor is further configured to execute the computer program to:

obtain the control instruction in response to the electronic device being in the first state; and control a controller of the electronic device to send a state switching instruction to a second system of the electronic device in response to the control instruction; and in response to the state switching instruction, control the second system to update the parameter of the memory from the corresponding parameter in the first operation state to the corresponding parameter in the second operation state.

* * * * *